(12) United States Patent
Dadlani Mahtani et al.

(10) Patent No.: US 9,329,589 B2
(45) Date of Patent: May 3, 2016

(54) INTERACTIVE DEVICE ADAPTED TO INTERACTIVELY COMMUNICATE WITH A REMOTE DEVICE

(75) Inventors: Pavankumar M. Dadlani Mahtani, Eindhoven (NL); Alexander Sinitsyn, Eindhoven (NL)

(73) Assignee: KONINKLIJKE PHILIPS N.V, Eindhoven (NL)

( * ) Notice: Subject to any disclaimer, the term of this patent is extended or adjusted under 35 U.S.C. 154(b) by 1169 days.

(21) Appl. No.: 13/319,102

(22) PCT Filed: May 5, 2010

(86) PCT No.: PCT/IB2010/051985
§ 371 (c)(1),
(2), (4) Date: Nov. 7, 2011

(87) PCT Pub. No.: WO2010/128470
PCT Pub. Date: Nov. 11, 2010

(65) Prior Publication Data
US 2012/0048122 A1 Mar. 1, 2012

(30) Foreign Application Priority Data
May 8, 2009 (EP) ..................................... 09159732

(51) Int. Cl.
*G05B 19/042* (2006.01)
*H04L 12/28* (2006.01)

(52) U.S. Cl.
CPC .... *G05B 19/042* (2013.01); *G05B 2219/23406* (2013.01); *G05B 2219/2643* (2013.01); *G05B 2219/36159* (2013.01); *H04L 12/282* (2013.01)

(58) Field of Classification Search
CPC .............................. H02J 2003/143; F24C 7/08
USPC ........... 236/91 F; 426/233, 523; 455/68, 353, 455/404.2, 408, 419, 557; 700/17, 19, 20, 700/22, 45, 65, 83, 143, 153, 174, 204, 205, 700/211, 296; 709/203, 218; 715/700, 709, 715/864, 786, 787; 340/5.62, 539.23, 686.6
See application file for complete search history.

(56) References Cited

U.S. PATENT DOCUMENTS 5,388,043 A * 2/1995 Hettinger ...................... 600/300
6,080,972 A * 6/2000 May .............................. 219/494
(Continued)

FOREIGN PATENT DOCUMENTS

EP          1028604        8/2000
JP       2006072894 A      3/2006
(Continued)

OTHER PUBLICATIONS

B. Myers: "Using Handhelds for Wireless Remote Control of PCs and Appliances"; Interacting With Computers, vol. 17, No. 3, 2005, pp. 251-264.
(Continued)

*Primary Examiner* — Kenneth M Lo
*Assistant Examiner* — Michael J Huntley

(57) ABSTRACT

This invention relates to an interactive device (100) to interactively communicate with a remote device (107). A receiver (101) receives event related information from a remote device which supplies the event related information which includes event progress information. A display (102) displays an image of the current status of the event based on the received event related information. A progress indicator (103) indicates the progress of the event based on received progress information. A sensor (104) receives a modification command from a user indicating a modification of the progress of the event, and a transmitter (105) for transmits the modification command to the remote device. The remote device then adjusts the progress of the event in accordance to the received modification command.

12 Claims, 4 Drawing Sheets

(56) References Cited

U.S. PATENT DOCUMENTS

| | | | |
|---|---|---|---|
| 6,559,882 B1* | 5/2003 | Kerchner | 348/61 |
| 6,718,215 B2* | 4/2004 | Friedrich et al. | 700/65 |
| 6,730,890 B2* | 5/2004 | Kish et al. | 219/506 |
| 7,030,781 B2* | 4/2006 | Jones | 340/994 |
| 7,064,681 B2* | 6/2006 | Horstemeyer | 340/994 |
| 7,089,107 B2* | 8/2006 | Jones | 701/465 |
| 7,124,087 B1* | 10/2006 | Rodriguez et al. | 705/5 |
| 7,155,213 B1* | 12/2006 | Almeda et al. | 455/419 |
| 7,295,099 B2* | 11/2007 | Lee et al. | 340/5.54 |
| 7,996,792 B2* | 8/2011 | Anzures et al. | 715/863 |
| 8,341,544 B2* | 12/2012 | Kerr | H04N 5/44513 715/786 |
| 8,930,438 B2* | 1/2015 | Williamson et al. | 709/203 |
| 2001/0039460 A1* | 11/2001 | Aisa | 700/17 |
| 2002/0067283 A1 | 6/2002 | Marmaropoulos | |
| 2003/0126593 A1* | 7/2003 | Mault | 725/10 |
| 2003/0195697 A1* | 10/2003 | Jones | 701/201 |
| 2004/0243664 A1* | 12/2004 | Horstemeyer | B60R 25/102 709/200 |
| 2005/0038530 A1* | 2/2005 | Nagasaka et al. | 700/19 |
| 2005/0085927 A1* | 4/2005 | Yamada et al. | 700/11 |
| 2005/0107897 A1* | 5/2005 | Callaghan | 700/87 |
| 2006/0022841 A1 | 2/2006 | Hoiness et al. | |
| 2006/0125800 A1* | 6/2006 | Janik | 345/173 |
| 2006/0190103 A1* | 8/2006 | Verkade et al. | 700/83 |
| 2007/0176820 A1* | 8/2007 | Vidal | 341/176 |
| 2008/0036575 A1 | 2/2008 | Huhn et al. | |
| 2008/0055264 A1* | 3/2008 | Anzures et al. | 345/173 |
| 2008/0132251 A1* | 6/2008 | Altman et al. | 455/457 |
| 2008/0236563 A1* | 10/2008 | Wilsdorf | 126/273 R |
| 2009/0005018 A1* | 1/2009 | Forstall et al. | 455/414.1 |

FOREIGN PATENT DOCUMENTS

| | | | |
|---|---|---|---|
| JP | 2006345269 A | 12/2006 | |
| JP | 2008286466 A | 11/2008 | |
| JP | 2009002593 A | 1/2009 | |
| WO | 2005067639 A2 | 7/2005 | |
| WO | WO2013098745 A2 * | 7/2013 | G06F 19/00 |

OTHER PUBLICATIONS

Nichols et al: "Studying the Use of Handhelds to Control Smart Appliances"; Proceedings of the 23rd International Conference on Distributed Computing Systems Workshops (ICDCSW'03), 2003 IEEE, pp. 274-279.

Nichols et al: "Controlling Home and Office Appliances With Smart Phones"; Pervasive Computing, Published by the IEEE CS and IEEE COMSOC, 2006, pp. 60-67.

* cited by examiner

INTERACTIVE DEVICE ADAPTED TO INTERACTIVELY COMMUNICATE WITH A REMOTE DEVICE

FIELD OF THE INVENTION

The present invention relates to an interactive device adapted to interactively communicating with a remote device and to a method of interactively communicating with the remote device. The present invention further relates to a remote device adapted to interactively communicating with the interactive device.

BACKGROUND OF THE INVENTION

In a domestic environment, many times it is required to continuously monitor a particular event. For example, if the event is cooking something in the oven or stove, one needs to keep track of the time the food is being cooked and assess its readiness. It is difficult to leave the cooking task and do something else in fear of it getting burnt and it is extremely cumbersome to keep checking to see if the cooking is ready or not, while doing other activities. It is namely often desired to do multiple activities at the same time, like watching TV while cooking.

Furthermore, if adjustment is needed to the cooking progress (e.g. it needs to be cooked longer), people need to go to the source (e.g. the oven, microwave, stove) to continuously check for this and adjust accordingly, which limits the possibility of doing other activities while cooking.

Some of the existing household devices, e.g. microwave, toaster, ovens are equipped with a timer. In the more advanced devices, when the timer runs out the devices are automatically turned off and sometimes produce a beep sound to call the attention of the user. More-sophisticated ovens as an example are computer controlled, which allows a wide variety of operating modes and special features including the use of a temperature probe to automatically shut the oven off when the food is completely cooked to the desired degree.

The event can also be related to that one expects family or friends to come over (or reach a particular destination), where the hostess always wonders when they would reach the desired destination. Often, the host calls the expected visitor being expected asking them whether they are on the way, where they are, how much time they have left, etc. This leads to many phone calls and unwanted task disruptions. Thus, there is a need of reassurance and clear expectation.

SUMMARY DESCRIPTION OF THE INVENTION

The object of the present invention is to overcome the above mentioned drawbacks by providing an interactive device that is capable of indicating and adjusting progress of an event.

According to a first aspect the present invention relates to an interactive device adapted to interactively communicating with a remote device, comprising:

- a receiver for receiving event related information from a remote device, the remote device being adapted to supply said event related information including event progress information,
- a progress indicator for indicating the progress of the event based on received progress information,
- a sensor for receiving a modification command from a user indicating a modification of the progress of the event, and
- a transmitter for transmitting the modification command to the remote device, the remote device being adapted to adjust the progress of the event in accordance to the received modification command.

It is thus possible to indicate the progress of the event to a user of the interactive device in a user friendly way. Further, depending on the use case, the user can now adjust the progress of the event directly via the modification command.

In one embodiment, the device further comprises a light emitting rim structure that at least partly peripherally surrounds the device, the progress indicator being indicated by means of illuminating a lengthwise portion of the rim structure such that the length is proportional to the progress of the event. In one embodiment, the sensor is a light sensor or touch sensor integrated into the rim structure, whereby touching the rim structure the length of the illuminated lengthwise portion is adjusted and thus the progress of the event. In another embodiment, the progress indicator is indicated by means of illuminating a portion of a display, where said sensor is a light sensor or touch sensor integrated into the display adapted to detect a touch command from the user onto the display indicating an adjustment of the illuminated portion and thus an adjustment of the progress of the event. Accordingly, a photo-frame like display device is provided which both serves as a display device and also as a "remote control" that is capable of receiving modification commands from the user indicating how to modify the progress of the event.

In one embodiment, the remote device is a household appliance comprising a built-in progress adjuster for adjusting the progress in accordance to said modification command, the event being cooking food and the event progress information including:

- the time until cooking the food is completed, or
- the temperature of the item being cooked, or
- the temperature within the household appliance during cooking, or
- combination thereof.

In that way, highly sophisticated household devices are provided with the capability of interactively communicating with the interactive device, e.g. a photo frame, where the user of the interactive display device can adjust the progress of the event directly. As an example, the users can now leave the kitchen while the cooking is in progress and do other activities with a better peace of mind since the interactive device can be placed in another room and indicate the cooking progress without requiring the user's focus of attention by using the progress of light around the ambient display.

In one embodiment, the event related information from said remote device further include image data of the event and where displaying said current status of the event is based on the displaying the received image data of the event. In that way, an oven or a microwave oven may as an example be provided with a built in camera that takes an image of the item being cooked, and transmits the image data to the interactive display device, which displays the image. In that way, the user does not need to stand in the kitchen all the time because he/she can view the cooking status "live". Thus, the user can use the time during cooking to do other things. Also, the user can from another room adjust e.g. the temperature of the oven if the image indicates that the temperature is too high/low, or the user can increase/decrease the temperature remotely.

In one embodiment, displaying said current status of the event comprised displaying pre-stored image or image sequence of the event, where the received event related information are adapted to trigger which of the pre-stored image or image sequence are being displayed. Accordingly, the received event related information may be time and the displayed status may be displaying grilled chicken. As an example, the interactive display device may comprise multiple images of e.g. grilled chicken, roast-beef, ham, etc, where each image is associated with timing data. As an example, an image of an uncooked chicken could be associated with timing data 0-20 minutes and the image data is white chicken, from 21-40 minutes the image data is a light brown chicken, from 41-60 darker, etc. Additional data associated to each image could be temperature values, because the color of the displayed image does of course depend on the temperature of the oven so the larger the temperature is the shorter become said time intervals because the cooking time becomes shorter.

In one embodiment, the event is a person's arrival event, the remote device being a positioning system and the received event related information include positioning information indicating the current position of the person, the progress of the event being the remaining time until arrival of the person. In that way, a very user friendly way is provided to allow a host to keep track on the arrival time of the expected visitor.

In one embodiment, the event progress information include the person's arrival time, the remote device having a built-in progress adjuster, the modification command from the user indicating an updated preferred arrival time, the built-in progress adjuster being adapted to instruct the person to adjust the arrival event in accordance to the received modification command. In that way, the host as an example can request an expected visitor to hurry up or to slow down.

In one embodiment, displaying said image of the current status of the event based on the received event related information includes displaying:
a picture of the expected person, or
a geographical data indicating the current geographical position of the person, or
graphically the remaining time until arrival of the person, or
a combination thereof.

Accordingly, the displayed image could be a picture of the expected person along with a time indicator displayed either on the display or said frame structure by e.g. illuminating a lengthwise portion of the rim structure such that the length is proportional to the progress of the event, i.e. indicates the remaining time (or lapsed time).

In one embodiment, the event is activity monitoring and the remote device is a user's activity monitor, the progress indicator being adapted to define or adjust goal settings. It follows that a user can adjust the goal by e.g. touching said rim structure or display and by doing so a feedback is given and the progress is shown in getting to the user's goal. Accordingly, the user can select a goal of amount of activity by touching a point on the rim structure. As an example, each side of the rim could indicate particular amount of activity, so where the user touches on the rim the goal on amount of activity is set. In that way, the interactive display device may be adapted to picking up updates info on activity from an external server for example. The activity monitor can as an example be accelerometer or a GPS system integrated into a hand-held device (watch, mobile phone and the like).

According to another aspect, the present invention relates to a method of interactively communicating with a remote device, comprising:
receiving event related information from a remote device, the remote device being adapted to supply said event related information including event progress information,
indicating the progress of the event based on received progress information,
receiving a modification command from a user indicating a modification of the progress of the event, and
transmitting the modification command to the remote device, the remote device being adapted to adjust the progress of the event in accordance to the received modification command.

According to still another aspect, the present invention relates to a computer program product for instructing a processing unit to execute the above mentioned method steps when the product is run on a computer.

According to yet another aspect, the present invention relates to a remote device adapted to interactively communicating with said interactive device, comprising:
a transmitter for transmitting said event related information including said event progress information,
a receiver adapted to receive said modification command from the user indicating a modification of the progress of the event, and
a program adjuster adapted to adjust the progress in accordance to said modification command.

In one embodiment, the remote device is selected from:
an electronic household appliance,
a device comprising a Global Positioning System (GPS),
a device comprising a Global System for Mobile communications (GSM).

The aspects of the present invention may each be combined with any of the other aspects. These and other aspects of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
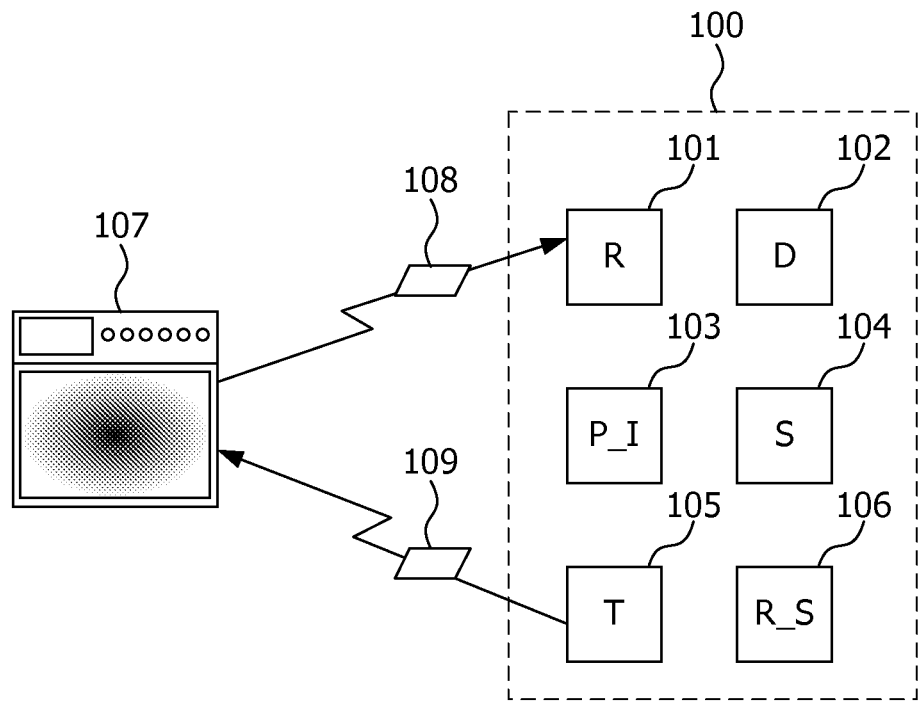
FIG. 1 shows an embodiment of an interactive device according to the present invention.

FIG. 1 shows an embodiment of an interactive device 100 according to the present invention adapted to interactively communicating with a remote device 107, where the interactive device 100 comprises a receiver (R) 101, a display (D) 102, a progress indicator (P_I) 103, a sensor (S) 104, and a transmitter (T) 105.

The receiver (R) 102 receives event related information 108 from a remote device 107, which supplies said event related information, which include including event progress information. The remote device 107 may as an example be an electronic household appliance such as an oven or microwave oven, or the remote device may be a device comprising a Global Positioning System (GPS), a device comprising a Global System for Mobile communications (GSM), or a mobile device comprising a Global Positioning System (GPS) or Global System for Mobile communications (GSM).

In case the remote device 107 is an oven as depicted here, the event would be cooking food and the event progress information may be the time until cooking the food is completed, or the temperature of the item being cooked, or the temperature within the household appliance during cooking, or a combination thereof.

In case the remote device is a device that comprises a positioning system, the event may be a person's arrival event, where the received event related information includes positioning information indicating the current position of the person and the progress of the event is the remaining time until arrival of the person. These two embodiments will be discussed in more details later.

The display (D) 102 displays an image of the current status of the event based on the received event related information. In one embodiment, the event related information from the remote device 107 includes image data of the event and displaying the current status of the event is based on the displaying the received image data of the event. Accordingly, the oven 107 could take an image every minute and transmit the image data to the receiver (R) 101 of the interactive display device 100, which then displays the received image data.

In another embodiment, the current status that is displayed is based on displaying pre-stored image or image sequence of the event, where the received event related information trigger which of the pre-stored image or image sequence are being displayed. This means that the received timing information decide what kind of image is to be displayed. If as an example the event is baking pizza, there are several pizza images that are pre-stored and each of the images is associated with timing information. 0-5 minutes may be associated to unbaked pizza image, 6-10 minutes is associated to pizza image where the cheese is melted but the where the crust is still white, 11-15 minutes is where the cheese is yellowish and the crust is light brown, etc. In this way, the received timing information controls which of the pizza images is to be displayed. Further information may also be associated to the pre-stored images such as the temperature of the oven because the baking time depends on the temperature of the oven. The pre-stored image sequence could be a video of the process of baking pizza, where the temperature of the oven triggers the speed of the video, i.e. if the temperature is 150° C. the displayed video will take 20 minutes, whereas if the temperature is 200° C. the displayed video will take 15 minutes. This will of course be correlated such that the temperature vs. the time of the video matches perfectly, i.e. the "status" of the pizza in the video matches the actual status of the pizza in the oven 107.

In case the event is a person's arrival event, the display (D) 102 may display a picture of the expected person, and/or display a geographical data indicating the current geographical position of the person, and/or display graphically the remaining time until arrival of the person.

The progress indicator (P_I) 103 indicates the progress of the event based on received progress information. The progress indicator (P_I) 103 is indicated by means of illuminating a portion of the display, e.g. by illuminating a stripe/column or the like on the display.

In one embodiment, the interactive display device further comprises a light emitting rim structure (R S) 106 that at least partly peripherally surrounds the display (D) 102. In this embodiment, the progress indicator (P_I) 103 may be indicated by means of illuminating a lengthwise portion of the rim structure such that the length is proportional to the progress of the event, e.g. the longer the illuminating portion of the rim structure (R_S) 106 is the longer is the remaining time until the event is completed (e.g. the remaining cooking time).

The sensor (S) 104 receives a modification command from a user indicating a modification of the progress of the event. In one embodiment, the sensor is a light sensor or touch sensor integrated into the display or integrated into said rim structure (R_S) 106 and detects a touch command from the user onto the display indicating an adjustment of the illuminated portion and thus an adjustment of the progress of the event. Alternatively, the rim structure (R_S) 106 may be equipped with a capacitive sensor chip (e.g. QTouch™ as it is equipped in the Living Colors controller or on the touchpad of laptops/notepads) that will allow users to touch anywhere on the rim and adjust the light progress, thus adjusting the progress of the event. Accordingly, the user can modify the cooking duration by touching the display/rim structure and in that way adjust the progress of the event by extending or reducing the illuminated time indicator. In case the event is a person's arrival event, the user can influence expected arrival time of the expected person by adjusting the progress of the event, i.e. adjusting the time until expected arrival time. As an example, an sms text message can be sent to the mobile user (expected person) indicating the modification made 'come sooner' or 'come later' and further specifying the amount of modification.

It should be noted that various sensors can be used, such as a speech command sensor where the user can via speech command increase or reduce the remaining time of the event, or gesture sensors where said commands can be given via gesture.

The transmitter (T) 105 transmits the modification command to the remote device 107, which adjusts the progress of the event in accordance to the received modification command.

Figure 2:
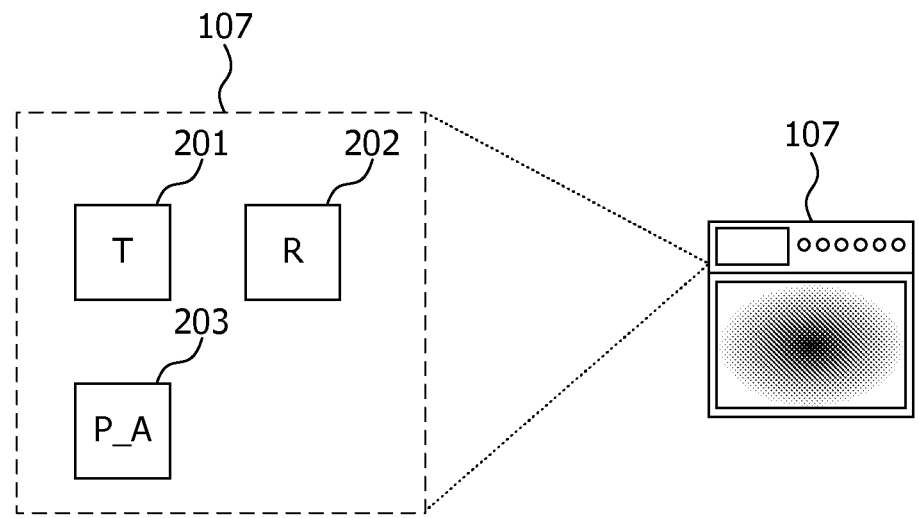
FIG. 2 shows an embodiment of a remote device according to the present invention, FIG. 3a, b, c, d shows one embodiment of an interactive device according to the present invention, FIG. 4a,b show another embodiment of the present invention.

FIG. 2 shows an embodiment of a remote device 107 according to the present invention, where the remote device comprises a transmitter (T) 201, a receiver (R) 202 and a program adjuster (P_A) 203.

The transmitter (T) 201 transmits said event related information 108 including said event progress information to said interactive display device 100, the receiver (R) 202 receives said modification command 109 from the user indicating a modification of the progress of the event, and the program adjuster (P_A) 203 adjusts the progress in accordance to said modification command. As an example, the modification command could be new timing information indicating reducing the baking time, or new temperature information indicating that the temperature should be increased from 150° C. to 200° C. More generally, the modification command may include various set-up commands for adjusting the setup of the remote device 107, e.g. increasing the power range for a microwave, adjusting the setup of the oven 107 from "blow" setup to "upper-heat" setup etc.

The remote device can as an example be any type of an electronic household appliance, or a device comprising a Global Positioning System (GPS) such as a mobile phone/person digital assistance (PDA). The remote device could just as well be a car comprising GPS system.

The progress adjuster (P_A) 203 may be any means such as a processor that utilizes the received modification command to adjust the progress, e.g. to adjust the timer of said oven 107 or that adjusts the temperature of the oven 107 (or microwave oven).

In case the remote device 107 is a mobile phone having an integrated GPS and/or PDA system, the modification command may include commands indicating that the car speed should be reduced or increased so as to meet adjusted progress of the event, namely a new arrival time. It would preferably be up to the user to follow these modification commands.

Figure 3A:
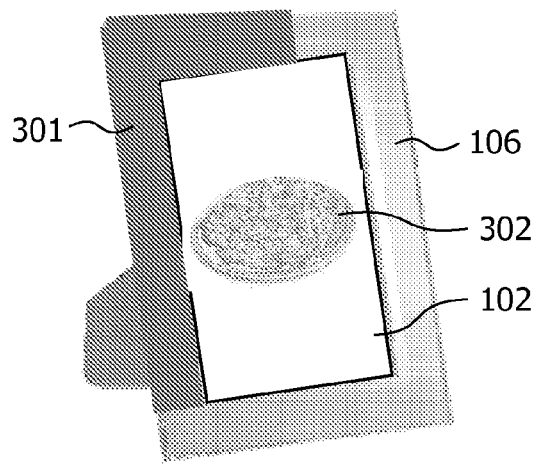

FIG. 3a shows one embodiment of an interactive display device 100 according to the present invention, where the display device is a light emitting photo frame 100, which provides context of the event/item that is in progress. As shown here the event is cooking food. The display 102 of the photo frame 100 is the central section of the light photo frame that is peripherally surrounded by said light emitting rim structure (R S) 106. The display 102 may show a direct video link or temperature of the item 302 being cooked on the microwave or oven, such that the user can assess the readiness of the item and adjust the duration of cooking accordingly via an appropriate modification command. As shown, a light progress indicator 301 on the photo frame 100 indicates the progress of cooking pizza 302 in the oven.

Figure 3B:
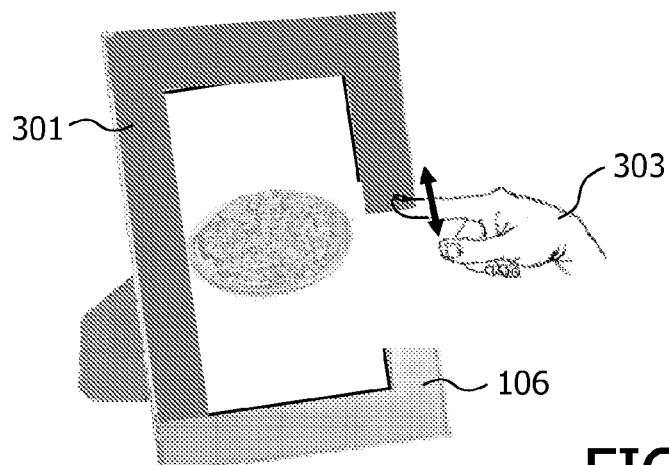

FIG. 3b shows where a user 303 adjusts the duration by touching anywhere on the rim. As shown, the user 303 touched the rim to make the duration shorter (i.e. advancing the light progress indicator). As soon as a 'cooking source', i.e. stove, oven, microwave, is switched on with a cooking item, the data becomes available via e.g. a local (wireless) network to the photo frame 100.

Figure 3C:
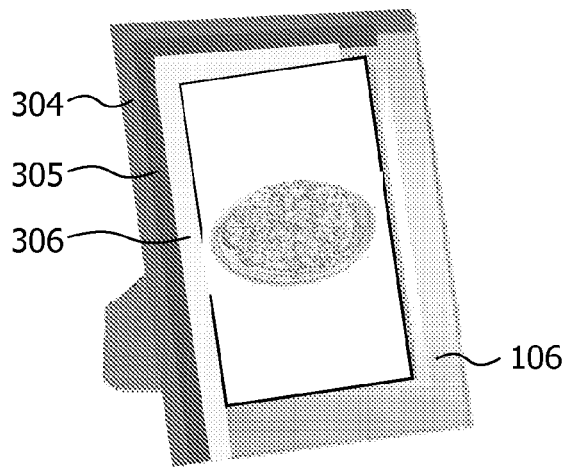

In one embodiment, if multiple cooking events are taking place, the photo frame 100 comprises multi-track light progress indicators such that the photo frame 100 can constantly, or by request of the user 303, switch to each event. Alternatively, each event may have a separate color 304-306 and be displayed on parallel light tracks and be adjusted separately as shown in FIG. 3c.

Figure 3D:
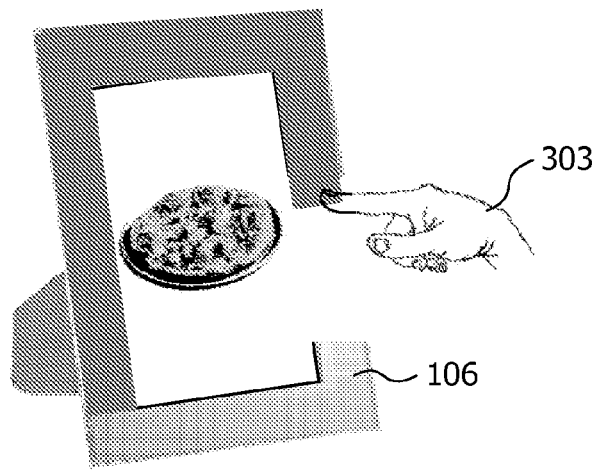

FIG. 3d shows one embodiment where the user 303 can, by touching anywhere on the rim 106, let the user view what the state of the event, i.e. cooking the pizza, would be at that particular time. The moment when the user releases his/her finger, the progress light goes back to the current state. Accordingly, by touching the rim in that way the sensor in the rim utilizes the touch command to either reduce or extend the timing information temporarily and displays the image that is associated to this timing information. As an example, if the actual timing info shows that there are 20 minutes remaining, but the user 303 adjusts this timing information to 40 minutes, the photo frame 100 will display how the pizza will look like after 40 minutes. This can be based on displaying the pizza image using history data where the pizza image that is associated with the timing information 40 minutes is displayed, which as shown here is a burned pizza. Thus, by touching at one point on the rim and the screen will show a picture of what it would look like and as soon as the user releases the finger, the light goes back to the current state.

The photo frame 100 may further include other controls keys which can be added to the picture frame's screen for controlling the cooking events, e.g. start and stop buttons.

Figure 4A:
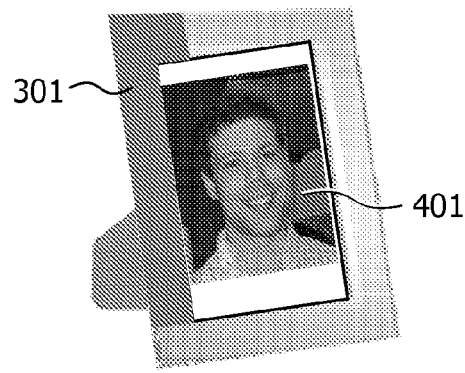
Figure 4B:

FIGS. 4a and 4b show another embodiment of the present invention, where the interactive display device is also a light emitting photo frame 100, and where the event is a person's arrival event and the displayed image is the expected person 401.

The progress light indicator 301 shows the amount of time left for a person to reach a certain destination. The distance between the person and the desired destination can be measured precisely using GPS technology or approximately using GSM cells route with the mobile phone carried by the person who is being tracked (for example, Google's My Location).

For example, person A leaves his/her office to meet with his/her partner B at home to have dinner together, where person B possesses the light emitting photo frame 100. Person A enables tracking mode on his/her mobile device e.g. by sending a message to the photo frame 100, where the message includes positioning information. The photo frame 100 utilizes this message to light up a portion of the rim 301, where the length of the illuminated portion indicating the progress of person A's arrival. This message may include identification (ID) data identifying the expected person A, so that e.g. a history data may be used to link the ID data to an image of the expected person. In that way the interactive display device (the photo frame 100) comprises pre-stored photos of e.g. all friends and relatives, where each of the photos is associated with ID data. In that way, the photo frame 100 knows which photo to show.

As shown in FIG. 4a, the display 102 shows a picture of the person being expected. Accordingly, person B has a clear expectation of who is coming and when he/she arrives.

In one embodiment, if more people are expected (e.g. a party event) and couple themselves to the interactive display device 100 via their mobile phones, the photo frame 100 switches between pictures and shows the progress accordingly, e.g. in a particular order set by the user e.g. from the one who will arrive the earliest to the one who will arrive the latest. Alternatively, each person has a dedicated color assigned and shown in parallel colored tracks as shown in FIG. 4b. Furthermore, the color used may represent if someone is coming as expected, unexpected, on time, early, late, etc.

In other scenarios, the event is goal setting where the progress indicator can be used for goal setting. In that way, one can adjust the goal by touching the rim structure and with light a give feedback is given and the progress is shown in getting to the user's goal. Another application is for activity monitoring, where using an activity monitor that the user carries around the users activity is monitored during the day (based on e.g. an accelerometer). Accordingly, the user can select a goal of amount of activity by touching a point on the rim. As an example, each side of the rim could indicate particular amount of activity, so where the user touches on the rim the goal on amount of activity is set. In that way, the interactive display device 100 may be adapted to picking up updates info on activity from an external server for example.

Figure 5:
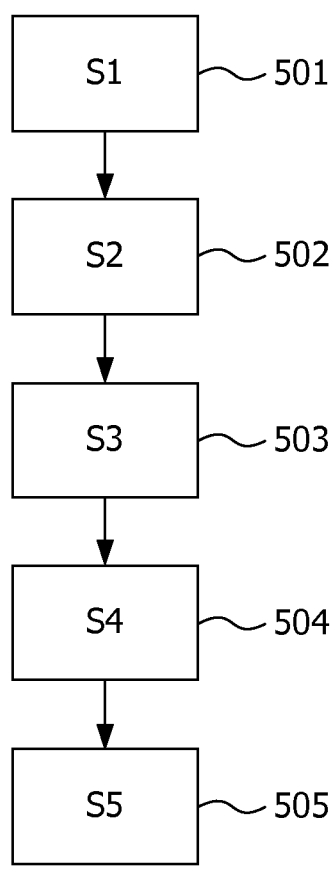
FIG. 5 shows a flowchart of a method according to the present invention of interactively communicating with a remote device.

FIG. 5 shows a flowchart of a method according to the present invention of interactively communicating with a remote device.

In step (S1) 501, event related information are received from a remote device, where the remote device is adapted to supply the event related information including event progress information. In step (S2) 502, an image of the current status of the event is displayed based on the received event related information. The event can as an example be a cooking event (e.g. baking pizza) and the event related information may as an example include the remaining time until the cooking is completed, temperature of an oven or microwave oven, and the various setups of the oven or microwave oven and even image data of the event. Displaying said current status of the event can be displaying the received timing/image data of the event. The event can also be person's arrival event and the event related information can be positioning information indicating the current position of the person.

In step (S3) 503, the progress of the event is indicated based on received progress information, and in step (S4) 504, a modification command is received from a user indicating a modification of the progress of the event. The event progress information may include lapsed or remaining time until cooking the food is completed, or the temperature of the item being cooked, or the temperature within the household appliance during cooking, or combination. The progress of the event may as an example be indicated by illuminating a lengthwise portion of said display (see FIG. 3) or said rim such that elapsed time/remaining time are clearly visible to a user. The modification command can accordingly be adjusting this event progress information.

In step (S5) 505, the modification command is transmitted to the remote device, the remote device being adapted to adjust the progress of the event in accordance to the received modification command. Referring to the example above, the oven may adjust the time and/or the temperature and/or the setup of the oven in accordance to the received modification command.

Certain specific details of the disclosed embodiment are set forth for purposes of explanation rather than limitation, so as to provide a clear and thorough understanding of the present invention. However, it should be understood by those skilled in this art, that the present invention might be practiced in other embodiments that do not conform exactly to the details set forth herein, without departing significantly from the spirit and scope of this disclosure. Further, in this context, and for the purposes of brevity and clarity, detailed descriptions of well-known apparatuses, circuits and methodologies have been omitted so as to avoid unnecessary detail and possible confusion.

Reference signs are included in the claims, however the inclusion of the reference signs is only for clarity reasons and should not be construed as limiting the scope of the claims.

The invention claimed is:

1. An interactive device adapted for communicating with a remote device, comprising:
a receiver for receiving event related information from a remote device, the remote device being adapted to supply said event related information including event progress information;
a progress indicator for indicating the progress of the event based on received progress information;
a sensor for receiving a modification command from a user indicating a modification of the progress of the event;
a transmitter for transmitting the modification command to the remote device, the remote device being adapted to adjust the progress of the event in accordance to the received modification command; and
a light emitting rim structure that at least partly peripherally surrounds a display for displaying an image of a current status of the event based on the received event related information, wherein the progress indicator comprises an illuminated lengthwise portion of the rim structure such that a length of the illuminated lengthwise portion of the rim structure is proportional to the progress of the event, and
wherein the sensor comprises a light sensor or touch sensor integrated into the rim structure, wherein responsive to the modification command that comprises (i) the user touching the rim structure in a first manner, the length of the illuminated lengthwise portion is adjusted and the modification command is transmitted to the remote device for adjusting the progress of the event, and (ii) the user touching the rim structure in a second manner that includes temporarily touching and releasing a user's touch, to either reduce or extend event timing information temporarily, wherein the display displays an image using history data of a status of the event associated with a particular time corresponding to a point of the temporary touch on the rim structure, and as soon as the user's touch is released, the length of the illuminated lengthwise portion and the display return to the current status of the event.

2. The interactive device according to claim 1, wherein the progress indicator comprises an illuminated portion of the display, and wherein said sensor further comprises a light sensor or touch sensor integrated into the display adapted to detect the modification command that comprises a touch command from the user onto the display indicating an adjustment of the illuminated portion, and wherein the modification command is transmitted to the remote device for adjusting the progress of the event.

3. The interactive device according to claim 1, wherein the remote device comprises a household appliance that includes a builtin progress adjuster for adjusting the progress in accordance to said modification command, the event being cooking food and the event progress information including:
a time until cooking the food is completed, or
a temperature of an item being cooked, or
a temperature within the household appliance during cooking, or
a combination thereof.

4. The interactive device according to claim 1, wherein the event related information received from said remote device further includes image data of the event, and wherein displaying said current status of the event is based on displaying the received image data of the event.

5. The interactive device according to claim 1, wherein displaying said current status of the event comprises displaying a prestored image or image sequence of the event, wherein the received event related information includes data of the event and wherein displaying said current status of the event is further based on the received data of the event.

6. The interactive device according to claim 1, wherein the event is a person's arrival event, wherein the remote device comprises a positioning system and the received event related information includes positioning information indicating a current position of the person, and wherein the progress of the event comprises a remaining time until arrival of the person.

7. The interactive device according to claim 6, wherein the event progress information includes the person's arrival time, wherein the remote device further comprises a builtin progress adjuster, wherein the modification command from the user is transmitted via the transmitter for indicating an updated preferred arrival time, and wherein responsive to the modification command, the remote device's builtin progress adjuster is adapted to instruct the person, via the remote device, to adjust the person's arrival event in accordance with the received modification command.

8. The interactive device according to claim 1, wherein the event comprises activity monitoring and the remote device comprises a user's activity monitor, and wherein the progress indicator is adapted to define or adjust goal settings, via the sensor.

9. A method of interactively communicating with a remote device, comprising:
receiving, via a receiver, event related information from a remote device, the remote device being adapted to supply said event related information including event progress information;
indicating, via a progress indicator, a progress of the event based on received progress information;
receiving, via a sensor, a modification command from a user indicating a modification of the progress of the event;
transmitting, via a transmitter, the modification command to the remote device, the remote device being adapted to adjust the progress of the event in accordance to the received modification command; and providing a light emitting rim structure that at least partly peripherally surrounds a display for displaying an image of a current status of the event based on the received event related information, wherein indicating the progress further comprises illuminating a lengthwise portion of the rim structure such that a length of the illuminated lengthwise portion of the rim structure is proportional to the progress of the event, and wherein receiving, via the sensor, comprises receiving, via a light sensor or touch sensor integrated into the rim structure, wherein responsive to the modification command that comprises (i) the user touching the rim structure in a first manner, adjusting, via the progress indicator, the length of the illuminated lengthwise portion, and transmitting, via the transmitter, the modification command to the remote device for adjusting the progress of the event, and (ii) the user touching the rim structure in a second manner that includes temporarily touching and releasing a user's touch, to either reduce or extend event timing information temporarily, displaying, via the display, an image using history data of a status of the event associated with a particular time corresponding to a point of the temporary touch on the rim structure, and as soon as the user's touch is released, returning the length of the illuminated lengthwise portion and the display to the current status of the event.

10. A nontransitory computer readable medium embodied with a computer program that comprises a set of instructions executable by a processing unit for instructing the processing unit to carry out the method of claim 9.

11. A remote device in interactive communication with the interactive device as claimed in claim 1, the remote device comprising:
- a transmitter for transmitting said event related information including said event progress information;
- a receiver adapted to receive said modification command from the user indicating a modification of the progress of the event; and
- a program adjuster adapted to adjust the progress of the event in accordance to said modification command.

12. The remote device according to claim 11, wherein the remote device is selected from:
- an electronic household appliance,
- a device comprising a Global Positioning System (GPS), and
- a device comprising a Global System for Mobile communications (GSM).

\* \* \* \* \*